United States Patent
Lamesch

(10) Patent No.: US 7,502,711 B2
(45) Date of Patent: Mar. 10, 2009

(54) ERROR COMPENSATION METHOD FOR A 3D CAMERA

(75) Inventor: Laurent Lamesch, Lamadelaine (LU)

(73) Assignee: IEE International Electronics & Engineering S.A., Luxembourg (LU)

(*) Notice: Subject to any disclaimer, the term of this patent is extended or adjusted under 35 U.S.C. 154(b) by 0 days.

(21) Appl. No.: 11/719,995

(22) PCT Filed: Nov. 9, 2005

(86) PCT No.: PCT/EP2005/055835

§ 371 (c)(1),
(2), (4) Date: May 23, 2007

(87) PCT Pub. No.: WO2006/056530

PCT Pub. Date: Jun. 1, 2006

(65) Prior Publication Data

US 2007/0299627 A1 Dec. 27, 2007

(30) Foreign Application Priority Data

Nov. 23, 2004 (EP) .................... 04106024

(51) Int. Cl.
*G01B 5/02* (2006.01)
(52) U.S. Cl. .................................... 702/158
(58) Field of Classification Search ................. 702/158; 348/42–46, 162–164
See application file for complete search history.

(56) References Cited

U.S. PATENT DOCUMENTS 6,002,423 A 12/1999 Rappaport et al.

OTHER PUBLICATIONS

Sprigi T. et al.; "The Lock-In CCD—Two Dimensional Synchronous Detection of Light"; IEEE Journal of Quantum Electronics, IEEE Inc. New York, US, vol. 31, No. 9, Sep. 1, 1995, pp. 1705-1708, XP000526180; ISSN: 0018-9197; *Section II. Measurement Principal; p. 1705; Equation (1)*.
Sprigi T. et al.; "The Multitap Lock-Ink CCD With Offset Subtraction"; IEEE Transactions on Electron Devices, IEEE Inc. New York, US, vol. 44, No. 10, Oct. 1997, pp. 1643-1647, XP000703874; ISSN: 0018-9383; *Section II Measurement Principle; p. 1643-1644; Equation (4)*.
International Search Report; PCT/EP2005/055835; Feb. 27, 2006.

*Primary Examiner*—Tung S Lau
*Assistant Examiner*—Xiuquin Sun
(74) *Attorney, Agent, or Firm*—Cantor Colburn LLP

(57) ABSTRACT

A method for determining a distance value d in a scene from an output of a four-tap 3D imager sensor is disclosed wherein said distance value d is determined based on the charge accumulated in a pixel of said imager sensor during a predetermined integration time Tintg. According to the invention said predetermined integration time Tintg is subdivided into a number of partial integration intervals (T1, T2, T3, T4) and said distance value d is calculated based on the individual tap responses of the four taps at the end of each of said partial integration intervals (T1, T2, T3, T4).

9 Claims, No Drawings

ERROR COMPENSATION METHOD FOR A 3D CAMERA

TECHNICAL FIELD OF THE INVENTION

The present invention generally relates to an occupant sensing system for an automotive vehicle, which is based on an imager system and more specifically to an error compensation method for a 3D camera respectively to a method for improving the distance determination by means of a 3D time-of-flight camera.

BRIEF DISCUSSION OF RELATED ART

The appropriate control of secondary restraint systems, like e.g. airbags and the like, in automotive vehicles requires a reliable sensing of the occupation status of the vehicle seat, to which the secondary restraint system is associated. The secondary restraint system is in fact most effective, if its deployment is adapted to the actual occupation situation of the vehicle seat. Furthermore, a reliable sensing of a position of a possible occupant is very important in order to disable the airbags, if the occupant is out of position, e.g. if the occupant is in a position in which the deployment of the airbag would likely result in severe injuries of the passenger.

One type of occupant sensing systems is based on an optical imager system for determining the presence of an occupant and/or its current sitting position and/or the localisation e.g. of the occupant's head. Such an optical imager system comprises e.g. a CCD or a CMOS camera for monitoring a specific sensing area and an associated control unit for evaluating the images taken by the camera. The control unit uses suitable image processing algorithms for detecting a predetermined pattern indicative e.g. of a passenger presence, and for detecting the position of a specific part as e.g. the passenger head. Based on this position, the control unit may conclude on the sitting position of the passenger and generate a corresponding control signal for the airbag control unit.

As the position of the passenger has to be determined in the three-dimensional space, it is advantageous to use a 3D-camera, which records depth information simultaneously with the recording of a situational image. Such 3D cameras are generally based on the time of flight (TOF) principle, wherein the distance to an object is determined based on the charge accumulated during a specific integration time in a pixel of the imager. Such a camera thus immediately provides the required data enabling a determination of a position in the three-dimensional space.

However the currently known four-tap imager sensor suffers from inherent gain and offset errors. These errors translate into an error in the distance measurement by the 3D-TOF camera.

BRIEF SUMMARY OF THE INVENTION

The invention provides a method for determining a corrected distance value from the sensor response of a 3D imager.

In order to overcome the abovementioned problems, the present invention proposes a method for determining a distance value d in a scene from an output of a four-tap 3D imager sensor, wherein said distance value d is determined based on the charge accumulated in a pixel of said imager sensor during a predetermined integration time $T_{intg}$, in which said predetermined integration time $T_{intg}$ is subdivided into a number of partial integration intervals ($T_1$, $T_2$, $T_3$, $T_4$) and wherein said distance value d is calculated based on the individual tap responses of the four taps at the end of each of said partial integration intervals ($T_1$, $T_2$, $T_3$, $T_4$).

DETAILED DESCRIPTION OF THE INVENTION

In preferred embodiments of this method, the number of partial integration intervals is four and/or said partial integration intervals have a substantially identical length.

During recordation of the scene, said scene is usually illuminated by a light source for generating an illumination. In a preferred embodiment of the invention this illumination has a different phase for each of said partial integration intervals. Said scene may for instance be illuminated by a light source for generating an illumination wherein a phase of said illumination is shifted by 90 degrees between two contiguous partial integration intervals.

The method for determining the corrected distance value preferably comprises the steps of a) subdividing said predetermined integration time $T_{intg}$ into four partial integration intervals $T_1$, $T_2$, $T_3$, $T_4$ of substantially the same length ($T_1=T_2=T_3=T_4=T_{intg}/4$);

b) at the end of the first integration interval $T_1$, determining the output voltages of the four taps $Tap_0$, $Tap_1$, $Tap_2$, $Tap_3$ and storing the determined voltage values as $A_{0\_0}$ ($Tap_0$), $A_{1\_0}$ ($Tap_1$), $A_{2\_0}$ ($Tap_2$), $A_{3\_0}$ ($Tap_3$), said output voltage values being proportional to the charge accumulated during the partial integration interval $T_1$ in each of said four taps;

c) at the end of the first integration interval $T_1$ and prior to the beginning of the second integration interval $T_2$ shifting a phase of a scene illumination by 90 degrees with respect to the illumination applied during $T_1$;

d) at the end of the second interval $T_2$, determining the output voltages of the four taps $Tap_0$, $Tap_1$, $Tap_2$, $Tap_3$ and storing the determined voltage values as $A_{0\_90}$ ($Tap_0$), $A_{1\_90}$ ($Tap_1$), $A_{2\_90}$ ($Tap_2$), $A_{3\_90}$ ($Tap_3$), said output voltage values being proportional to the charge accumulated during the partial integration interval $T_2$ in each of said four taps;

e) at the end of the second integration interval $T_2$ and prior to the beginning of the third integration interval $T_3$ shifting a phase of a scene illumination by 180 degrees with respect to the illumination applied during $T_1$;

f) at the end of the third integration interval $T_3$, determining the output voltages of the four taps $Tap_0$, $Tap_1$, $Tap_2$, $Tap_3$ and storing the determined voltage values as $A_{0\_180}$ ($Tap_0$), $A_{1\_180}$ ($Tap_1$), $A_{2\_180}$ ($Tap_2$), $A_{3\_180}$ ($Tap_3$), said output voltage values being proportional to the charge accumulated during the partial integration interval $T_3$ in each of said four taps;

g) at the end of the third integration interval $T_3$ and prior to the beginning of the fourth integration interval $T_4$ shifting a phase of a scene illumination by 270 degrees with respect to the illumination applied during $T_1$;

h) at the end of the fourth interval $T_4$, determining the output voltages of the four taps $Tap_0$, $Tap_1$, $Tap_2$, $Tap_3$ and storing the determined voltage values as $A_{0\_270}$ ($Tap_0$), $A_{1\_270}$ ($Tap_1$), $A_{2\_270}$ ($Tap_2$), $A_{3\_270}$ ($Tap_3$), said output voltage values being proportional to the charge accumulated during the partial integration interval $T_4$ in each of said four taps.

The corrected distance d (in m) may be determined with the formula:

$$d = \frac{c}{f \cdot 4 \cdot \pi} \cdot a\tan2$$

$$(A_{2\_0} + A_{3\_90} + A_{0\_180} + A_{1\_270} - (A_{0\_0} + A_{1\_90} + A_{2\_180} + A_{3\_270}),$$

$$A_{3\_0} + A_{0\_90} + A_{1\_180} + A_{2\_270} - (A_{1\_0} + A_{2\_90} + A_{3\_180} + A_{0\_270}))$$

wherein a tan 2 (x,y) is the four quadrant inverse tangent function of the real parts of the elements of x and y, c is the speed of light (in m/s), and f is the modulation frequency of the illumination (in Hz).

In preferred embodiments, the sums and difference operations are implemented as digital hardware adders and subtractors, and/or the division and atan operation is implemented as a transformation from rectangular to polar coordinates with a digital successive approximation device.

The idea underlying the present invention is accordingly to split the integration interval into 4 identically long short integration intervals, record the four integrated tap responses at the end of each short integration interval end, and use these 16 values for a distance calculation with less error.

The advantage is that the distance calculation based on this method results in a distance output with less error. Gain and offset errors which are constant over time are completely eliminated.

For the measurement of a 3D image according to the prior art, an imager requires an integration interval of Tintg, which extends over several periods of the modulation, i.e. which comprises a plurality of illumination periods. The improved method which is described here splits this interval into four intervals $T_1$, $T_2$, $T_3$, $T_4$ which have all substantially the same length: $T_1=T_2=T_3=T_4=T_{intg}/4$.

At the end of the first integration interval $T_1$, the output voltages of the four taps Tap0, Tap1, Tap2, Tap3 are measured and stored as $A_{0\_0}=Tap_0$, $A_{1\_0}=Tap_1$, $A_{2\_0}=Tap_2$, $A_{3\_0}=Tap_3$. The output voltages are proportional to the charge accumulated during the integration interval $T_1$.

During the next integration interval $T_2$, the phase of the illumination is shifted with 90 degrees relatively to the illumination applied during $T_1$. At the end of the second interval $T_2$, the outputs of the four taps $Tap_0$, $Tap_1$, $Tap_2$, $Tap_3$ are measured and stored as $A_{0\_90}=Tap_0$, $A_{1\_90}=Tap_1$, $A_{2\_90}=Tap_2$, $A_{3\_90}=Tap_3$. The output voltages are proportional to the charge accumulated during the integration interval $T_2$.

During the next integration interval $T_3$, the phase of the illumination is shifted with 180 degrees relatively to the illumination applied during $T_1$. At the end of the third interval $T_3$, the outputs of the four taps $Tap_0$, $Tap_1$, $Tap_2$, $Tap_3$ are measured and stored as $A_{0\_180}=Tap_0$, $A_{1\_180}=Tap_1$, $A_{2\_180}=Tap_2$, $A_{3\_180}=Tap_3$. The output voltages are proportional to the charge accumulated during the integration interval $T_3$.

During the next integration interval $T_4$, the phase of the illumination is shifted with 270 degrees relatively to the illumination applied during $T_1$. At the end of the fourth interval $T_4$, the outputs of the four taps $Tap_0$, $Tap_1$, $Tap_2$, $Tap_3$ are measured and stored as $A_{0\_270}=Tap_0$, $A_{1\_270}=Tap_1$, $A_{2\_270}=Tap_2$, $A_{3\_270}=Tap_3$. The output voltages are proportional to the charge accumulated during the integration interval $T_4$.

The stored values are then used to calculate the corrected distance d in m with the following formula:

$$d = \frac{c}{f \cdot 4 \cdot \pi} \cdot atan2$$

$$(A_{2\_0} + A_{3\_90} + A_{0\_180} + A_{1\_270} - (A_{0\_0} + A_{1\_90} + A_{2\_180} + A_{3\_270}),$$

$$A_{3\_0} + A_{0\_90} + A_{1\_180} + A_{2\_270} - (A_{1\_0} + A_{2\_90} + A_{3\_180} + A_{0\_270}))$$

where a tan 2 (x,y) is the four quadrant inverse tangent function of the real parts of the elements of x and y, c is the speed of light in m/s, and f is the modulation frequency of the illumination in Hz.

The invention claimed is:

1. Method for determining a distance value in a scene from an output of a four-tap 3D imager sensor, wherein said distance value is determined based on the charge accumulated in a pixel of said imager sensor during a predetermined integration time comprising
   subdividing said predetermined integration time into a number of partial integration intervals;
   determining, at the end of each of said partial integration intervals, individual tap responses for the four taps; and
   calculating said distance value based on the individual tap responses of the four taps at the end of each of said partial integration intervals.

2. Method according to claim 1, wherein said partial integration intervals have a substantially identical length.

3. Method according to claim 1, wherein the number of partial integration intervals is four.

4. Method according to claim 1, wherein said scene is illuminated by a light source for generating an illumination, said illumination having a different phase for each of said partial integration intervals.

5. Method according to claim 1, wherein said scene is illuminated by a light source for generating an illumination and wherein a phase of said illumination is shifted by 90 degrees between two contiguous partial integration intervals.

6. Method for determining a distance value in a scene from an output of a four-tap 3D imager sensor, wherein said distance value is determined based on the charge accumulated in a pixel of said imager sensor during a predetermined integration time said method comprising
   a) subdividing said predetermined integration time into four integration intervals of substantially the same length; said four integration intervals comprising a first, second, third, and fourth integration interval;
   b) at the end of the first integration interval, determining the output voltages of the four taps and storing the determined voltage values as, said output voltage values being proportional to the charge accumulated during the partial integration interval in each of said four taps;
   c) at the end of the first integration interval and prior to the beginning of the second integration interval, shifting a phase of a scene illumination by 90 degrees with respect to the illumination applied during the first integration interval;
   d) at the end of the second interval, determining the output voltages of the four taps and storing the determined voltage values as, said output voltage values being proportional to the charge accumulated during the partial integration interval in each of said four taps;
   e) at the end of the second integration interval and prior to the beginning of the third integration interval, shifting a phase of a scene illumination by 180 degrees with respect to the illumination applied during the first integration interval;
   f) at the end of the third integration interval, determining the output voltages of the four taps and storing the determined voltage values as, said output voltage values being proportional to the charge accumulated during the third integration interval in each of said four taps;
   g) at the end of the third integration interval and prior to the beginning of the fourth integration interval shifting a phase of a scene illumination by 270 degrees with respect to the illumination applied during the first integration interval;
   h) at the end of the fourth integration interval, determining the output voltages of the four taps and storing the determined voltage values as, said output voltage values being proportional to the charge accumulated during the fourth integration interval in each of said four taps;

i) calculating said distance value based on the individual tap responses of the four taps at the end of each of said integration intervals.

7. Method according to claim 6, comprising the step of determining said distance value $d$ (in m) with the formula:

$$d = \frac{c}{f \cdot 4 \cdot \pi} \cdot a\tan2$$
$$(A_{2\_0} + A_{3\_90} + A_{0\_180} + A_{1\_270} - (A_{0\_0} + A_{1\_90} + A_{2\_180} + A_{3\_270}),$$
$$A_{3\_0} + A_{0\_90} + A_{1\_180} + A_{2\_270} - (A_{1\_0} + A_{2\_90} + A_{3\_180} + A_{0\_270}))$$

wherein d is said distance value;

$A_{0\_0}, A_{1\_0}, A_{2\_0}, A_{3\_0}$ are the voltage values determined at the end of the first integration interval for the first, second, third, and fourth tab respectively;

$A_{0\_90}, A_{1\_90}, A_{2\_90}, A_{3\_90}$ are the voltage values determined at the end of the second integration interval for the first, second, third, and fourth tab respectively;

$A_{0\_180}, A_{1\_180}, A_{2\_180}, A_{3\_180}$ are the voltage values determined at the end of the third integration interval for the first, second, third, and fourth tab respectively;

$A_{0\_270}, A_{1\_270}, A_{2\_270}, A_{3\_270}$ are the voltage values determined at the end of the fourth integration interval for the first, second, third, and fourth tab respectively;

a tan 2 (x, y) is the four quadrant inverse tangent function of the real parts of the elements of x and y, $c$ is the speed of light (in m/s), and f is the modulation frequency of the illumination (in Hz).

8. Method according to claim 7, wherein said sums and difference operations are implemented as digital hardware adders and subtractors.

9. Method according to claim 7, wherein the division and at an operation is implemented as a transformation from rectangular to polar coordinates with a digital successive approximation device.

* * * * *